(12) United States Patent
Williams

(10) Patent No.: US 9,071,139 B2
(45) Date of Patent: Jun. 30, 2015

(54) HIGH CURRENT SWITCHING CONVERTER FOR LED APPLICATIONS

(75) Inventor: Richard Williams, Cupertino, CA (US)

(73) Assignee: ADVANCED ANALOGIC TECHNOLOGIES INCORPORATED, Santa Clara, CA (US)

( * ) Notice: Subject to any disclaimer, the term of this patent is extended or adjusted under 35 U.S.C. 154(b) by 0 days.

(21) Appl. No.: 12/194,411

(22) Filed: Aug. 19, 2008

(65) Prior Publication Data
US 2013/0313996 A1 Nov. 28, 2013

(51) Int. Cl.
H02M 3/158 (2006.01)
H05B 37/02 (2006.01)
H05B 33/08 (2006.01)

(52) U.S. Cl.
CPC .............. *H02M 3/158* (2013.01); *H05B 37/02* (2013.01); *H05B 33/0815* (2013.01)

(58) Field of Classification Search
USPC ....... 315/291, 209 R, 294, 297; 323/222, 282
See application file for complete search history.

(56) References Cited

U.S. PATENT DOCUMENTS

| | | | |
|---|---|---|---|
| 5,923,152 A * | 7/1999 | Guerrera | 323/222 |
| 6,271,651 B1 * | 8/2001 | Stratakos et al. | 323/282 |
| 6,864,641 B2 | 3/2005 | Dygert | |
| 7,235,954 B2 | 6/2007 | Murakami | |
| 7,777,704 B2 | 8/2010 | S et al. | |
| 7,990,119 B2 | 8/2011 | Petty | |
| 8,179,051 B2 | 5/2012 | Zhao | |
| 8,531,164 B2 | 9/2013 | D'Angelo | |
| 2003/0090246 A1 * | 5/2003 | Shenai et al. | 323/259 |
| 2004/0135522 A1 | 7/2004 | Berman et al. | |
| 2006/0028150 A1 | 2/2006 | Vitunic et al. | |
| 2006/0108933 A1 | 5/2006 | Chen | |
| 2008/0258636 A1 | 10/2008 | Shih et al. | |
| 2009/0102444 A1 | 4/2009 | Nonaka | |
| 2009/0108776 A1 | 4/2009 | Zhao | |
| 2009/0128045 A1 | 5/2009 | Szczeszynski et al. | |
| 2009/0187925 A1 | 7/2009 | Hu et al. | |
| 2009/0206808 A1 * | 8/2009 | Wrathall | 323/282 |
| 2009/0230881 A1 * | 9/2009 | Chen et al. | 315/294 |
| 2010/0019751 A1 | 1/2010 | Chen et al. | |
| 2010/0045210 A1 | 2/2010 | Hariharan | |
| 2010/0156315 A1 | 6/2010 | Zhao et al. | |
| 2010/0201278 A1 | 8/2010 | Zhao | |
| 2013/0293208 A1 | 11/2013 | D'Angelo et al. | |
| 2013/0300293 A1 | 11/2013 | D'Angelo | |
| 2014/0042997 A1 | 2/2014 | D'Angelo | |

FOREIGN PATENT DOCUMENTS

WO  2007096868 A1  8/2007

OTHER PUBLICATIONS

Texas Instruments, Synchronous Buck Converter Design Using TPS56xx Controllers in SLVP10x EVMs User Guide, Sep. 1998.

* cited by examiner

*Primary Examiner* — Douglas W Owens
*Assistant Examiner* — Jonathan Cooper
(74) *Attorney, Agent, or Firm* — Lando & Anastasi, LLP

(57) ABSTRACT

A step-up switching voltage regulator includes two or more inductors and a switching network. A control circuit drives the switching network in a repeating sequence that includes: a magnetizing phase where the inductors are connected in series between an input voltage and ground; and a charge transfer phase where the inductors are connected in parallel to provide current to an output node with at least one of the inductors is connected between ground and the output node.

20 Claims, 12 Drawing Sheets

Fig. 2A
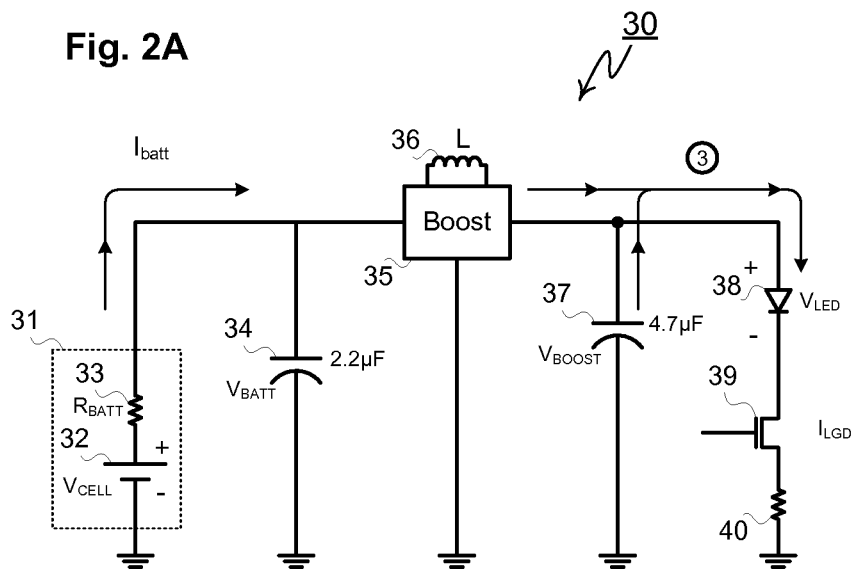
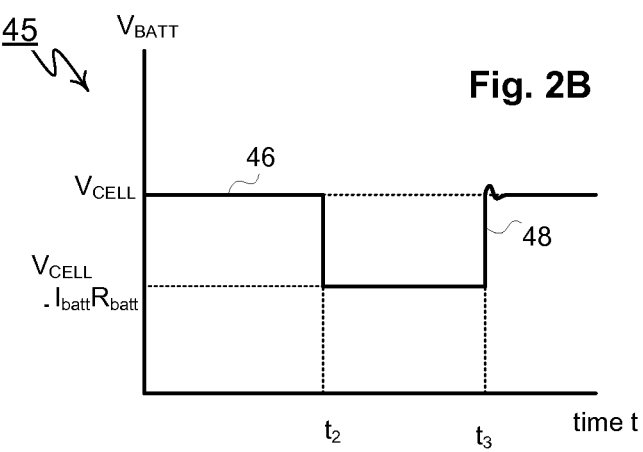
Fig. 2B

HIGH CURRENT SWITCHING CONVERTER FOR LED APPLICATIONS

BACKGROUND OF THE INVENTION

Many applications exist for step-up voltage converters capable of delivering high-currents. One such application is the need to drive LEDs at high currents for the camera flash function. The brightness of white LEDs is proportional to current. Currents may range from a few hundred milliamperes to several amperes. At high currents the voltage drop across a white LED can be more than three to four volts. Special high-intensity LEDs for high brightness camera flash applications exhibit even higher voltages, voltages higher than the voltage of a single cell lithium ion battery. In order to drive such high brightness LEDs, the battery voltage must be stepped up to a higher potential.

While charge pump converters can be used up to one half ampere, the input current of a charge pump is multiplied by the voltage conversion ratio. A doubler charge pump produces an output voltage double its input but requires an input current at least double its output. So at one-half ampere LED current, the input current of the charge pump LED driver exceeds one ampere. At higher currents, the input current demand of a charge pump becomes excessive. In such instances a boost type switching regulator is preferred.

As shown in FIG. 1A, boost converter and switching regulator 1 comprises power MOSFET 2, inductor 3, Schottky rectifier 4, output capacitor 5 and PWM controller 10. The converter drives camera flash LED 6 with the flash current and duration set by MOSFET 7, resistor 8, and flash control timing circuit 9. Flash operation comprises pre-charging capacitor 5 before driving LED 6 at high currents. Pre-charging involves turning on low-side MOSFET 2 and magnetizing inductor 3 with current conduction path (1) for some duration $t_{on}$ then turning off low-side MOSFET 2, whereby inductor 3 drives the potential $V_x$ above the converter's output, i.e. above that of the potential across capacitor 5. During this interval, Schottky diode 4 becomes forward biased and transfers energy from inductor 3 to capacitor 5 as shown by current-conduction path (2).

The converter alternates between conduction states (1) and (2) until the boost output voltage $V_{boost}$ reaches its target value set by PWM controller 10 reacting in response to feedback voltage $V_{FB}$. This pre-charging operating sequence is illustrated by voltage ramp 21 illustrated in graph 20 of FIG. 1B, stabilizing at a potential $V_{ready}$ 22 at time $t_1$. During this interval flash MOSFET 7 remains biased in an off condition, the current $I_{LED}$ in light emitting diode 6 is zero, and LED 6 does not illuminate.

At time $t_2$, flash controller 9 turns on power MOSFET 7 and current flows from the boost converter's output through LED 6, conducting MOSFET 7, and current setting resistor 8 to ground along the conduction path designated by the dashed arrow (3). Assuming MOSFET 7 has an on-state resistance of $R_{DS(on)}$ and resistor $R_{set}$ has a resistance substantially greater than the MOSFET's on-resistance, the current flowing during this interval is then given by the relation $$I_{LED} = \frac{V_{boost} - V_{f(LED)}}{R_{DS(on)} + R_{set}} \approx \frac{V_{boost} - V_{f(LED)}}{R_{set}}$$

Assuming that $V_{f(LED)}$ at high current is 4.5V, the $V_{boost}$ is biased to 4.6V, and using a resistor value of $R_{set}$=0.1Ω, then $I_{LED}$=1 A.

Although a 1 A current is thirty times the current normally used for lighting LEDs, high brightness flash LEDs typically comprise an array of parallel LEDs. Moreover in a camera flash application, the LED conduction duration is limited to a few hundred milliseconds. By controlling the flash time, the total energy dissipated by the LEDs is limited and the LED array is not damaged.

During the flash interval, the $I_{LED}$ current 24 decays in proportion to the sagging $V_{boost}$ voltage 23 present on capacitor 5. During the flash interval, converter 1 operating in fixed frequency operation naturally alternates between discharge path (3) and magnetizing condition (1), with the converter attempting to minimize the voltage sag on inductor 5. The degree of voltage sag depends on the magnitude of inductance in inductor 3 and the magnitude of capacitance of capacitor 5.

Operating in variable frequency mode during the flash, converter 1 may remain in the discharging state with conduction path (3) for an extended duration. If the inductor current drops too low, however, the LED brightness will fall to unacceptable brightness levels. To avoid this problem even in a variable frequency mode, converter 1 must occasionally return to condition (1) to magnetize inductor 3 and to, at least in part, restore its current.

At time $t_3$, when the flash interval is complete, MOSFET 7 is turned off and $I_{LED}$ drops to zero, during which the converter returns to alternating between states (1) and (2). With $I_{LED}$=0, the value of $V_{boost}$ recovers back to its ready state, as shown at time $t_4$.

One major limitation of an inductive boost converter is its need to draw high currents from the battery. In FIG. 1A, all current paths (1), (2), and (3) flows from the battery terminal $V_{batt}$. High currents flowing from and through the battery can cause a number of problems including sudden and unwanted voltage transients. This issue is further illustrated in flash driver schematic 30 in FIG. 2A where battery pack 31 powers boost converter 35 to drive LED 38. Power MOSFET 39 controls the flash duration while $V_{boost}$ and the value of resistance 40 sets LED current and brightness. Boost converter 36 includes input filter capacitor 34, inductor 36, and output filter capacitor 37.

The input power delivered to boost converter 34 is equal to the power delivered to the load and any additional power needed to operate converter 35. Assuming as a best case 100% efficiency of boost converter 35 then its power input must equal its power output so that $$P_{IN} = P_{OUT} = I_{batt}V_{batt} = V_{boost}I_{boost}$$

If the charge stored on output capacitor 37 is negligible compared to the total current required to fire flash LED 38 then it follows $I_{boost} \approx I_{LED}$ and therefore $$I_{batt} = I_{boost}\frac{V_{boost}}{V_{batt}} \approx I_{LED}\frac{V_{boost}}{V_{batt}}$$

Since by definition for a boost converter $V_{boost} > V_{batt}$, then the converter's average input must exceed the current load current $I_{LED}$ during the flash. For a 5V LED and a single cell lithium ion battery at 3.6V, the average input current to the converter is roughly 40% higher. So to achieve an average of 1 A an LED flash demands a 1.4 A current from the battery.

Referring again to FIG. 2A, battery pack 31 comprises electrochemical cell 32 with voltage $V_{cell}$ and internal resistance 33. Resistance 33 may comprise resistance associated with a battery's internal electrodes, electrochemical resistance, and any resistance introduced by protection electronics within the battery pack itself. In a single cell lithium ion battery pack for example, $V_{cell}$ may comprise a voltage 4.2V to 3V and the resistance $R_{battery}$ of resistor 33 can be as high as 500 mΩ. Ideally the battery's resistance should be zero. Because the resistance is not negligible, high currents can cause excess heating inside the battery pack and an unwanted voltage drop within the battery pack itself. Assuming a battery current $I_{batt}$, the battery's voltage at its terminals is given by $$V_{batt} = V_{cell} - R_{batt} I_{batt}$$

If, for example a 1.4 A current flows through a 500 mΩ pack, a 700 mV volt drop will occur in the pack. If the battery's cell is partially discharged to 3.5V, a sudden current spike to 1.4 A can cause the battery's terminal voltage to drop 2.8V. Such a transient is illustrated in graph 45 of FIG. 2B, where the unloaded battery starts with its cell voltage 46 then drops to a lower voltage 47. If this voltage is too low, it may trigger under-voltage protection in circuitry being powered by the battery, shutting off the electrical load and interrupting the product's operation. As soon as the current is interrupted, the voltage jumps up 48 to its unloaded voltage. The user perceives the impact of this unwanted voltage transient as spurious or unreliable product operation, or in the very least, as a shortened battery life.

Aside from issues of voltage transients from high currents, the overall power demanded by the LED during a camera flash puts additional requirements on a boost converter's operation.

LED Drive Energy and Power Requirements

The power requirements of the boost converter driving high current LEDs as a camera flash is given by the relation $$P = I_{LED} \cdot V_{f(LED)} = P_{light} + P_{heat}$$

The total power consumed by the LED is then 1 A times 4.5V or 4.5 W. As an energy conversion device, the optical efficiency of the LED is $\eta_\lambda$, then $$P_{heat} = (100\% - \eta_\lambda)(I_{LED} \cdot V_{f(LED)})$$

and assuming a 60% energy conversion efficiency $P_{heat}$=40% (4.5 W)=1.8 W of peak thermal dissipation divided among several LEDs in the array. Since the flash duty factor is very low, typically less than a few percent, the average power dissipation is only hundred milliwatts so that overheating and excessive LED temperatures are not critical.

Furthermore the thermal energy absorbed by the LED in a single-pulse is of limited duration, the LED is not damaged during a single pulse even at high currents. The absorbed thermal energy is given by the relation $$E_{heat} = P_{heat} \cdot t_{flash} = (100\% - \eta_\lambda)(I_{LED} \cdot V_{f(LED)}) t_{flash}$$

For example if the flash time $t_{flash}$ is several hundred milliseconds, e.g. 200 milliseconds, the total energy dissipated as heat is E=(1.8 W)(0.2 s)=360 mJ, not a large amount of energy for a short transient pulse.

The total energy supplied by the converter to the LED during the flash is larger, however, since it includes energy converted to the light output as well as to Joule heating. Given $$E = P_{total} t_{flash} = (I_{LED} \cdot V_{f(LED)}) t_{flash}$$

Then at 4.5V and 1 A, a 200 msec pulse requires a boost converter to deliver 900 mJ to power the flash operation.

In a boost converter 1 the energy stored in the output capacitor 5 is $$E = \frac{1}{2} C V_{boost}^2$$

Assuming C=4.7 uF, the capacitor stores only around 50 µj. The energy stored in inductor 3 is given by $$E = \frac{1}{2} L I_L^2$$

At 1 A, the energy stored in a 4.7 uH inductor is then only 2.3 µj. Both inductor 3 and capacitor 5 store too little energy to power the entire duration of flash. This means that using reasonable values of inductance and capacitance there is not enough energy stored in a boost converter to power the entire flash and instead the switching regulator must keep switching and transferring energy during the entire flash pulse. Operation of a switching converter however continuously draws power from the battery at an average current higher than the flash LED's current.

Super-Cap Flash Technique

To avoid the need for drawing current from the battery during a flash, a large storage capacitor can be used to supply the entire flash transient. Such a solution 50 is illustrated in FIG. 3 comprising battery pack 51, large storage capacitor 50, boost converter 56 with inductor 57 and filter capacitor 58, LED 59, power MOSFET 60 and current setting resistor 61. Battery pack 51 includes electrochemical cell 52 and internal resistance 53. It is assumed in this example that capacitor 55, herein referred to as a super capacitor or super-cap for short, has a capacitance many orders of magnitude above that of filter capacitor 58. Operation involves charging capacitor 55 then using the energy stored on capacitor 55 to power LED 59 through boost converter 56 during camera flash operation.

To estimate the magnitude of the energy that must be stored on super-cap 55, the relation $$E = P_{total} t_{flash} = (I_{LED} \cdot V_{f(LED)}) t_{flash} = \frac{1}{2} C_{sc} V_{sc}^2$$

must be satisfied. Rearranging terms gives $$C_{sc} = \frac{2}{V_{sc}^2} [(I_{LED} \cdot V_{f(LED)}) t_{flash}]$$

Super capacitors however can only be charged to low voltages, e.g. to 4V without damaging their internal dielectrics. Assuming the flash energy requirement of 900 mJ calculated previously the resulting capacitance required is then approximately 110 mF, i.e. over one-tenth of a Farad, four orders of magnitude greater than normal capacitors. Super capacitors up to one Farad are now commercially available. Several disadvantages of super capacitors, however, are that they are expensive and large, possibly too large to be useful in space conscious digital still cameras and camera phones.

Another complication of super-caps is that they cannot be charged directly from the battery. If an uncharged super-cap is connected directly across a battery, it behaves identically to a dead short and may damage the battery. Instead the charging current must be regulated by additional circuitry 54, adding and cost and complexity to the super-cap camera flash LED solution.

So while the super-cap solves the issue of drawing excessive currents from a battery pack during an LED camera flash it is expensive, large, and complex to operate. What is needed is a means to drive an LED at high currents and at voltages higher than the battery's voltage without drawing high or excessive currents from the battery during flash operation.

SUMMARY OF THE INVENTION

A switch-mode boost converter and step-up voltage regulator capable of delivering high output currents with low input currents is disclosed. The converter comprises two or more inductors and a switching network. The switching network allows the inductors to be alternately connected in a magnetizing configuration and a charge transfer configuration. For the magnetizing configuration, the inductors are connected in series between an input supply and ground. For the charge transfer configuration, each inductor is connected between ground and the parallel combination of an output capacitor and load. Operation of the converter involves alternating between the magnetizing and charge transferring configurations to transfer energy to the output capacitor and load under duty factor or variable frequency control using feedback of the output voltage to control timing of the switching.

In the case where two inductors are used, a first switch typically connects the input supply to a node $V_Z$. The first inductor connects the node $V_Z$ to a node $V_Y$. A second switch connects the node $V_Y$ to a node $V_W$. The second inductor connects the node $V_W$ to a node $V_X$. A third switch connects the node $V_X$ to ground. When the first, second and third switches are ON, the two inductors are connected in series between the input supply and ground for the magnetizing configuration.

A fourth switch connects the node $V_Z$ to ground and a fifth switch connects the node $V_W$ to ground. When these two switches are ON and the first through third switches are OFF, each inductor is connected between ground and the parallel combination of an output capacitor and load for the charge transfer configuration.

Diodes are placed between the inductors and the load to prevent current from flowing out of the load into ground through the two inductors. In some embodiments, these diodes may be replaced with switches that are driven out of phase with the switches which interconnect the inductors (e.g., the first through third switch described above). The use of switches effectively eliminates the voltage drop associated with the use of diodes.

For some embodiments one of the inductors remains connected to the input supply during charge transfer and magnetizing configurations. The remaining inductors function as previously described and are grounded during charge transfer. For such an embodiment, the first inductor connects the input supply to a node $V_Y$. A first switch connects the node $V_Y$ to a node $V_W$. The second inductor connects the node $V_W$ to a node $V_X$. A second switch connects the node $V_X$ to ground. When the first and second and third switches are ON, the two inductors are connected in series between the input supply and ground for the magnetizing configuration.

A third switch connects the node $V_W$ to ground. When this switch is ON and the first and second switches are OFF, each inductor is connected between ground and the parallel combination of an output capacitor and load for the charge transfer configuration. As before, operation of the converter involves alternating between the magnetizing and charge transferring configurations to transfer energy to the output capacitor and load under duty factor or variable frequency control using feedback of the output voltage to control timing of the switching.

The two inductor topologies can be extended to include three, four or any number of inductors. Additional inductors are connected in series during the magnetizing configuration and connected in parallel during the charge transfer configuration. Additional inductors require the use of additional switches to perform the series and parallel connections. The remaining inductors are grounded during charge transfer.

The converters described above are ideally suited to powering one or more LEDs in a camera flash. In such applications, the current provided to the LED's may be efficiently controlled by placing current mirrors in series with the flash LEDs. The current mirrors may themselves be controlled through the use of a digital to analog converter responsive to an external signal.

BRIEF DESCRIPTION OF THE DRAWINGS

FIG. 2A is a schematic of a prior art boost converter driving a camera flash.

FIG. 2B is a waveform depicting voltage as a function of time during operation of the boost converter of FIG. 2A.

DETAILED DESCRIPTION OF THE PREFERRED EMBODIMENTS

Figure 1A:
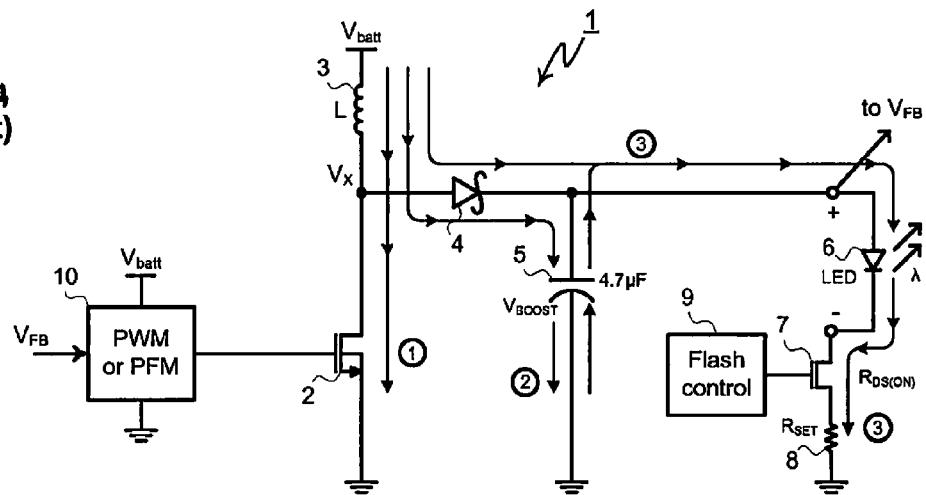
FIG. 1A is a schematic showing a prior art boost converter in a camera flash application.
Figure 1B:
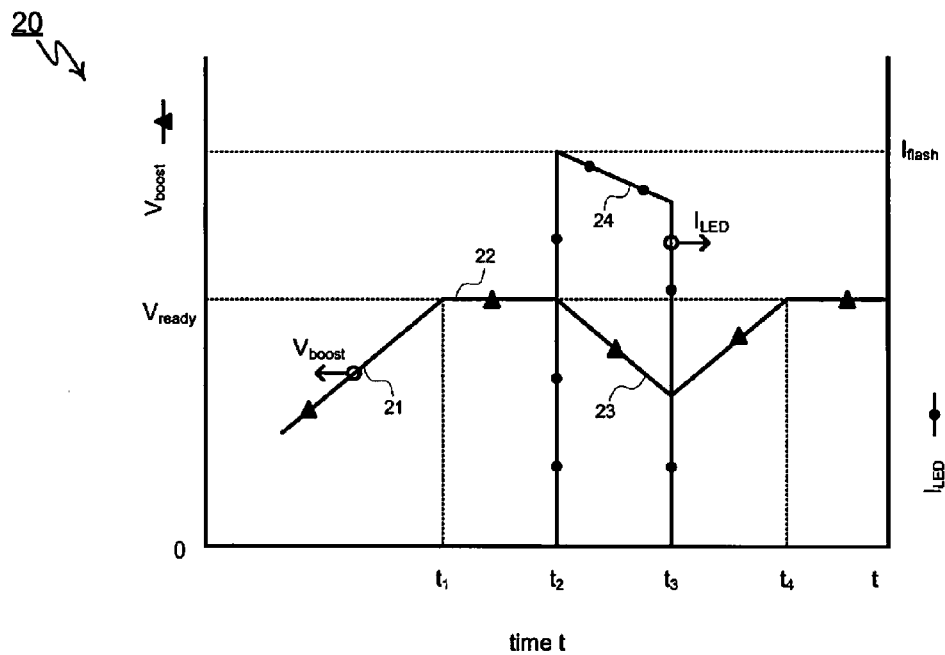
FIG. 1B is a waveform depicting operation of the boost converter of FIG. 1A.
Figure 3:
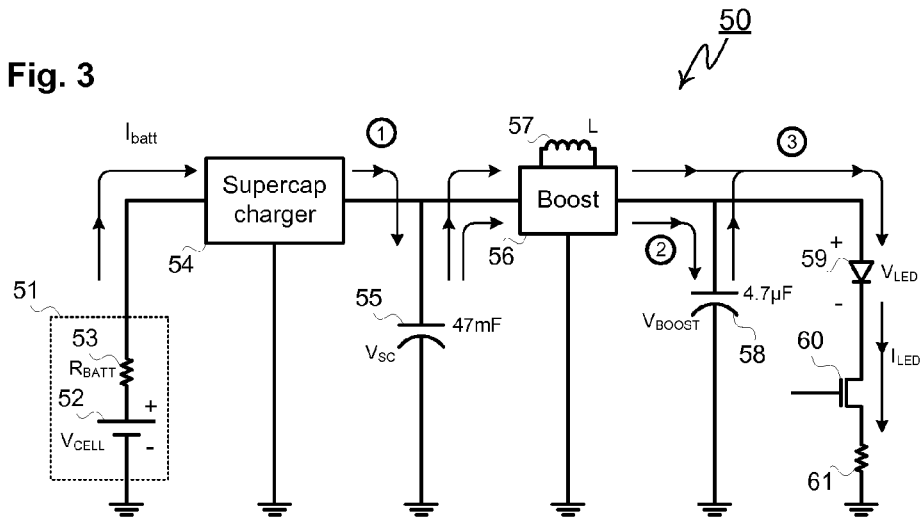
FIG. 3 is a schematic of a prior art boost converter driving a camera flash using a supercapacitor.
Figure 4:
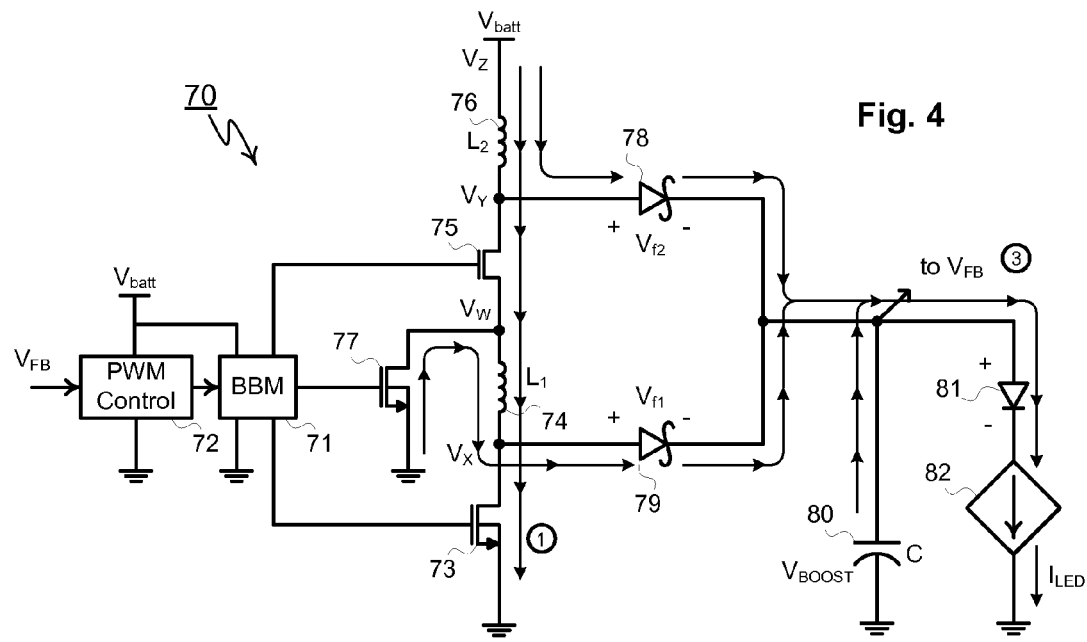
FIG. 4 is a schematic of a dual series inductor boost converter which corresponds to one possible embodiment of the present invention.

As shown in FIG. 4, disclosed boost converter 70 comprises PWM controller, break-before-make gate buffer 71, power MOSFETs 73, 75 and 77, inductors 76 and 74, rectifier diodes 78 and 79, and output capacitor 80. Unlike conventional single inductor boost converters, inventive boost converter 70 made in accordance with the present invention comprises two inductors that during magnetizing are connected in series and draw a prescribed amount of current from the battery. When transferring their energy to the converter's output, both inductors are connected to a common node, i.e., the output, thereby delivering twice the input current to the output. In the example shown, the disclosed converter drives a high current load, in this case, flash LED, i.e., light, emitting diode, 81. The current $I_{LED}$ in LED 81 is controlled by adjustable current source 82, ranging from zero to the maximum current supplied by boost converter 70.

Topologically boost converter 70 includes MOSFETs 73 and 75 connected in series with inductors 74 and 76 and with voltage input $V_{batt}$. Specifically N-channel MOSFET 73 is grounded with its drain connected to floating inductor 74 and the anode of rectifier 79 at node $V_x$. High-side inductor 76 is connected between $V_{batt}$ and node $V_y$. Node $V_y$ is also connected to the anode of rectifier diode 78 and to the source or drain of MOSFET 75. The other drain or source terminal of MOSFET 75 is connected to floating inductor 74 at node $V_w$ which is also connected to the drain of grounded N-channel MOSFET 77. MOSFET 75 may comprise a P-channel or N-channel MOSFET with appropriate changes in gate drive circuitry. In converter 70, the other terminal $V_z$ of inductor 76 not connected to $V_y$ is hardwired to the battery input so that $V_z=V_{batt}$. The cathodes of rectifier diodes 78 and 79 are connected to the output node $V_{boost}$ of the boost converter and the floating plate of filter capacitor 80. In the example shown, the electrical load of boost converter 70 comprises flash LED 81 and controlled current source 82.

Basic operation of the disclosed boost converter 70 involves alternating between magnetizing inductors 74 and 76, i.e. increasing the current flowing in the inductors by connecting them in series with the converter's battery input, and then transferring energy from the inductors into filter capacitor 80, i.e. charging the output capacitance to a voltage $V_{boost}$. PWM control circuit 72 determines the on time of MOSFETs 73 and 75 in response to feedback signal $V_{FB}$. PWM control may comprise fixed frequency variable pulse width operation or variable frequency operation. In response to PWM control circuit 72, break-before-make BBM buffer 71 drives MOSFETs 73 and 75 to conduct in phase and for these MOSFETs to conduct out-of-phase with low-side N-channel MOSFET 77 thereby preventing overlapping or simultaneous conduction in all three MOSFETs.

Voltage input $V_{batt}$ to converter 70 may be a battery or any other voltage source, regulated or un-regulated. One common input is a single cell lithium ion battery whose voltage ranges from 4.2V fully charged down to 3V when discharged. New generation lithium ion batteries may, alternatively, operate down to 2V at full discharge. Typically LED voltages $V_{LED}$, e.g. 4V to 5.5V, exceed $V_{batt}$ during camera flash operation and therefore require converter 70 to perform step-up voltage conversion, also known as boost conversion.

Figure 5A:
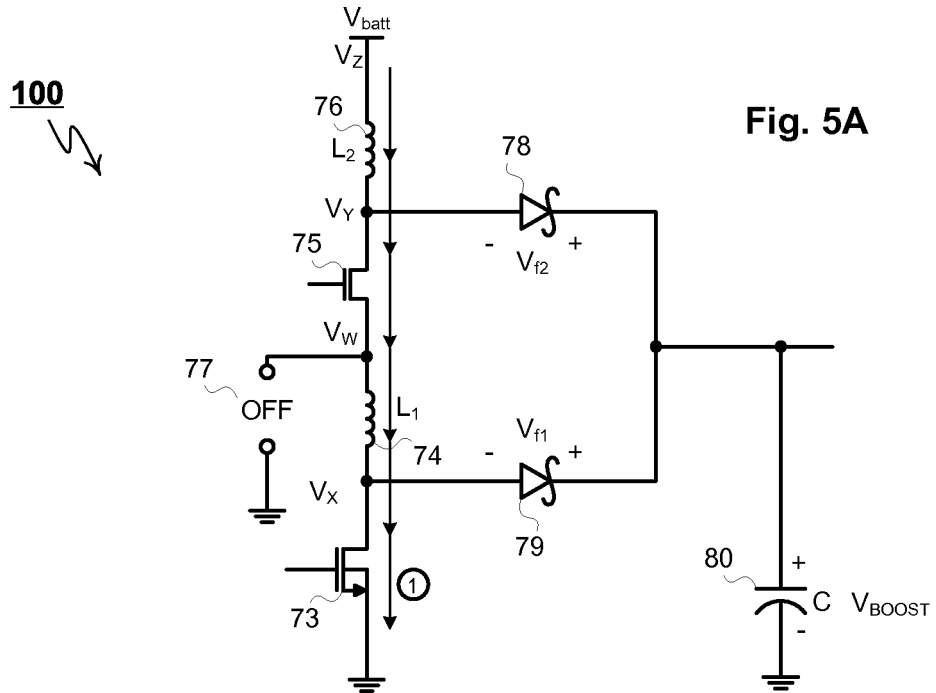
FIG. 5A is a schematic showing the dual series inductor boost converter of FIG. 4 during inductor magnetizing.

As shown in equivalent schematic 100 of FIG. 5A, in operation, MOSFETs 73 and 75 are biased "on" and in a conducting state so that current (1) flows in both inductors 74 and 76 while MOSFET 77 remains off and non-conducting. As illustrated in graph 130 of FIG. 6, during interval (1) the inductor current increases identically in both inductors 76 and 74 and is herein referred to as the magnetizing interval. Importantly during magnetizing, inductors 74 and 76 are connected in series, so $I_{L1}=I_{L2}=I_{batt}$ meaning that the same current flows in both inductors and the battery simultaneously. For example if a peak inductor current reaches 1.4 A in inductors 74 and 76, the peak battery current is also limited to 1.4 A.

Figure 6:
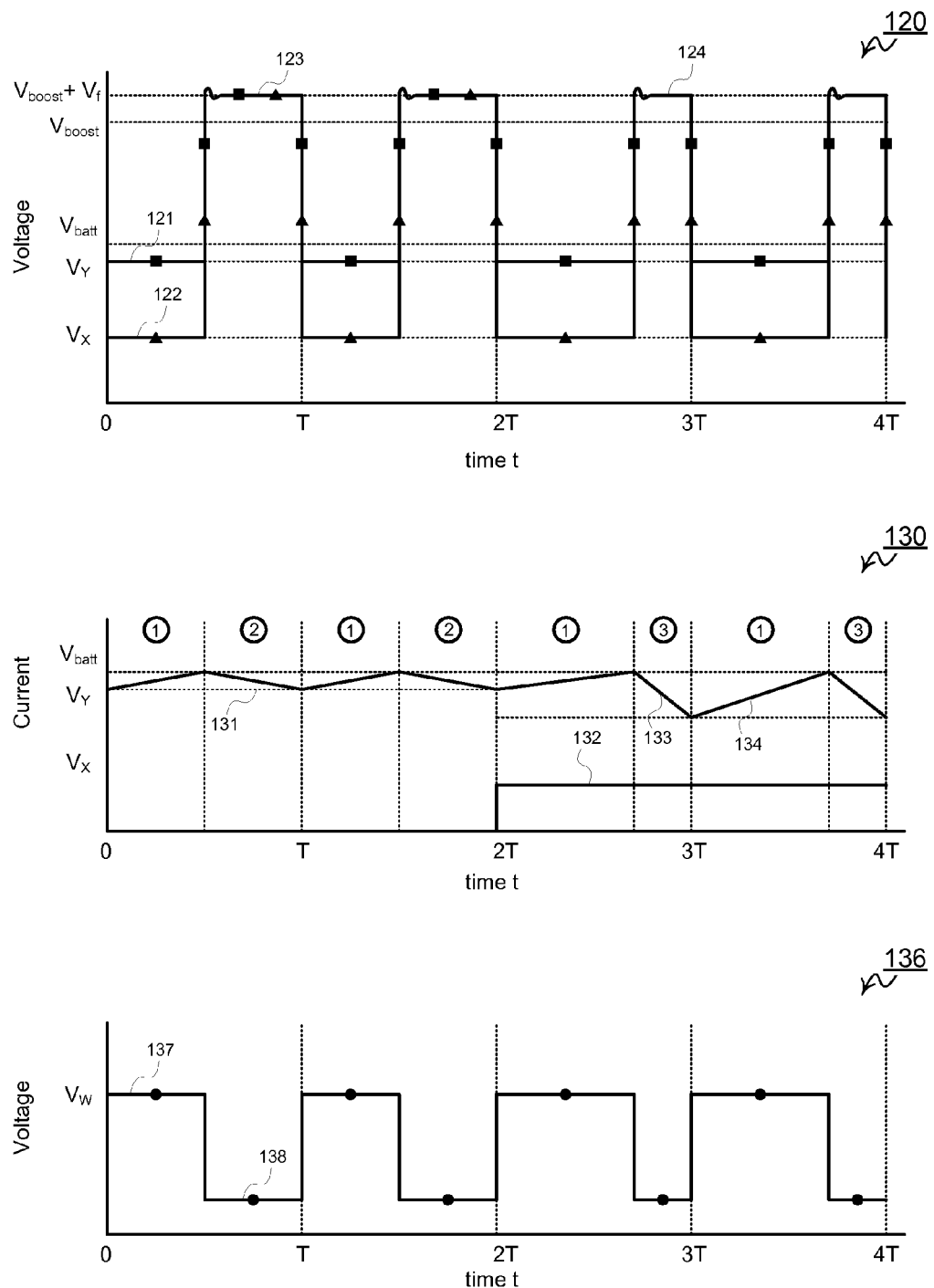
FIG. 6 depicts voltage and current waveforms of the dual series inductor boost converter of FIG. 4.

During magnetizing, the voltage $V_x$ shown in graph 120 of FIG. 6 is near ground at a voltage 122 and equal to the voltage drop across conducting MOSFET 73, i.e. $V_x=I_{L1} \cdot R_{DS(73)}$. The voltage $V_y$ is higher, comprising the voltage drop 121 across both conducting MOSFETs 73 and 75 and any drop across inductor 74, but still less than battery voltage $V_{batt}$. If the DC resistance of coils $L_1$ and $L_2$ both comprise a resistance of magnitude $r_{coil}$ then the MOSFETs resistance must be selected to set the maximum possible inductor current by the relation $$I_{Lpeak} = \frac{V_{batt}}{R_{DS(73)} + R_{DS(75)} + 2 \cdot r_{coil}}$$

In the magnetizing condition since $V_x<V_y<V_{boost}$, rectifier diodes 78 and 79 are non-conducting and reversed biased by voltages $V_{r2}$ and $V_{r1}$ respectively. More specifically in this condition $V_{r1}=V_{boost}-V_x \approx V_{boost}$ and $V_{r2}=V_{boost}-V_y<V_{r1}$. Since the highest reverse bias occurs on rectifier 79, the rectifier diodes require a maximum blocking voltage sufficient to withstand the converter's output voltage $V_{boost}$. Either P-N diodes or Schottky diodes may be employed. During magnetization, MOSFET 77 is off so that node $V_w$ exhibits a voltage 137 intermediate to $V_x$ and $V_y$ as shown in graph 136 of FIG. 6.

Figure 5B:
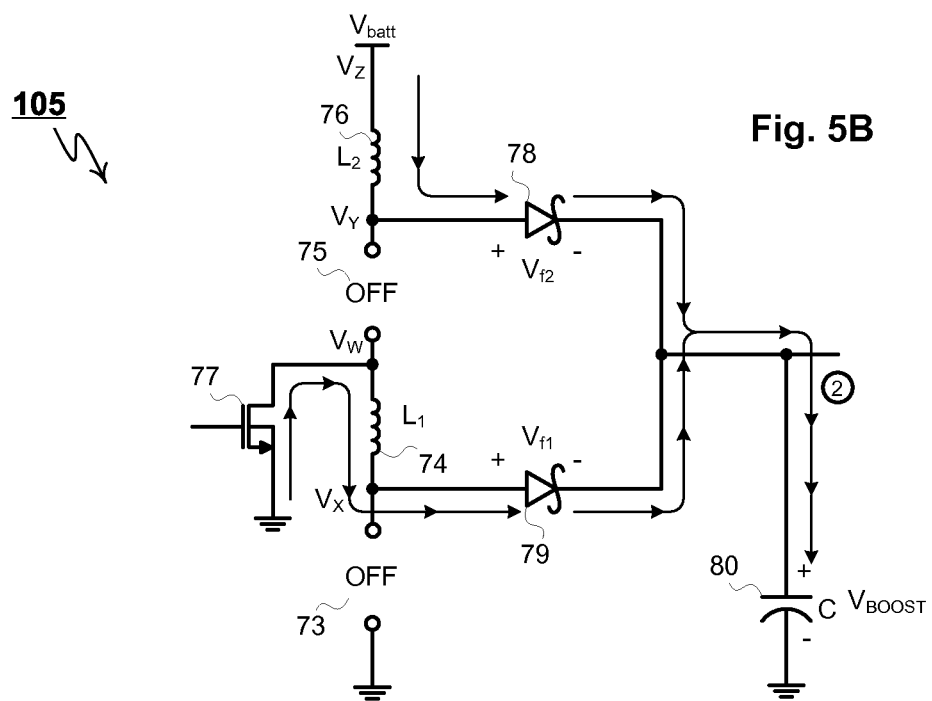
FIG. 5B is a schematic showing the dual series inductor boost converter of FIG. 4 during energy transfer.

Subsequent to magnetization, turning MOSFETs 73 and 75 off forces the voltage at nodes $V_x$ and $V_y$ to a positive potential above the boost converter's output voltage $V_{out}$. This voltage transient is a natural consequence of interrupting current in a conducting inductor as shown in equivalent schematic 105 of FIG. 5B. With $V_x>(V_{boost}+V_{f1})$ and $V_y>(V_{boost}+V_{f2})$ rectifier diodes 78 and 79 become forward biased and current (2) flows, simultaneously transferring energy from both inductors 74 and 76 to boost filter capacitor 80. This interval is therefore referred to herein as the converter's "transfer" interval. As shown by curve 131 in graph 130, during transfer interval (2), the currents in inductors 74 and 76 both decrease.

With both diodes conducting, positive-going nodes $V_x$ and $V_y$ are essentially connected in parallel and the total inductor current $I_C$ delivered to capacitor 80 is the sum of the two inductor currents, namely $I_C=(I_{L1}+I_{L2})$. If the average current of the triangle waveform of graph 131 is 1 A, then an average of 2 A will be delivered to the capacitor 80, twice the individual inductor current. To avoid this full current flowing through the battery the negative going sides of inductors 74 and 76 are not connected to a common node. Instead node $V_w$ is grounded by conducting MOSFET 77 and is not connected to $V_{batt}$. The voltage $V_w$ during transfer has a voltage equal to the voltage drop across conducting MOSFET 77, i.e. where $V_w=I_{L1} \cdot R_{DS(77)}$ as shown by line 138 in graph 136.

The current path through floating inductor 74 during the transfer interval flows from ground through MOSFET 77, inductor 74, diode 79 and into capacitor 80 and does not flow from the battery. In contrast, the current path through high-side inductor 76 during the transfer interval flows from the battery $V_{batt}$ through inductor 76, diode 78 and into capacitor 80. In this manner only one of the two inductors, i.e. high-side inductor 76, results in battery current during energy transfer to capacitor 80.

During the transfer phase, forward-voltages $V_{f1}$ and $V_{f2}$, the voltage drops across rectifier diodes 79 and 78 respectively, have a magnitude from 0.3V to 0.7V if Schottky diodes are used to implement the rectifier diodes. If P-N diodes are used, the voltage drop will exceed 0.7V and a higher power loss will occur during every transfer interval. The voltage at $V_x$ during charge transfer is therefore given by $V_x=(V_{boost}+V_{f1})$. Similarly, the voltage at $V_y$ during charge transfer is given by $V_y=(V_{boost}+V_{f2})$. Since $I_{L1}=I_{L2}$ the voltage drops $V_{f1}$ and $V_{f2}$ should be similar so that $V_x \approx V_y$ as shown by line 123 in graph 120.

When the high current load is not enabled the disclosed boost converter can alternate many cycles between equivalent-circuit 100 with current (1) during magnetizing and equivalent-circuit 105 with current (2) during transfer. This pre-flash operating condition is shown in graph 130 of FIG. 6 during the interval from 0 to 2T and further illustrated by the sequential oscillation between magnetize state (1) and charge transfer state (2) in state diagram 140 of FIG. 7.

Figure 5C:
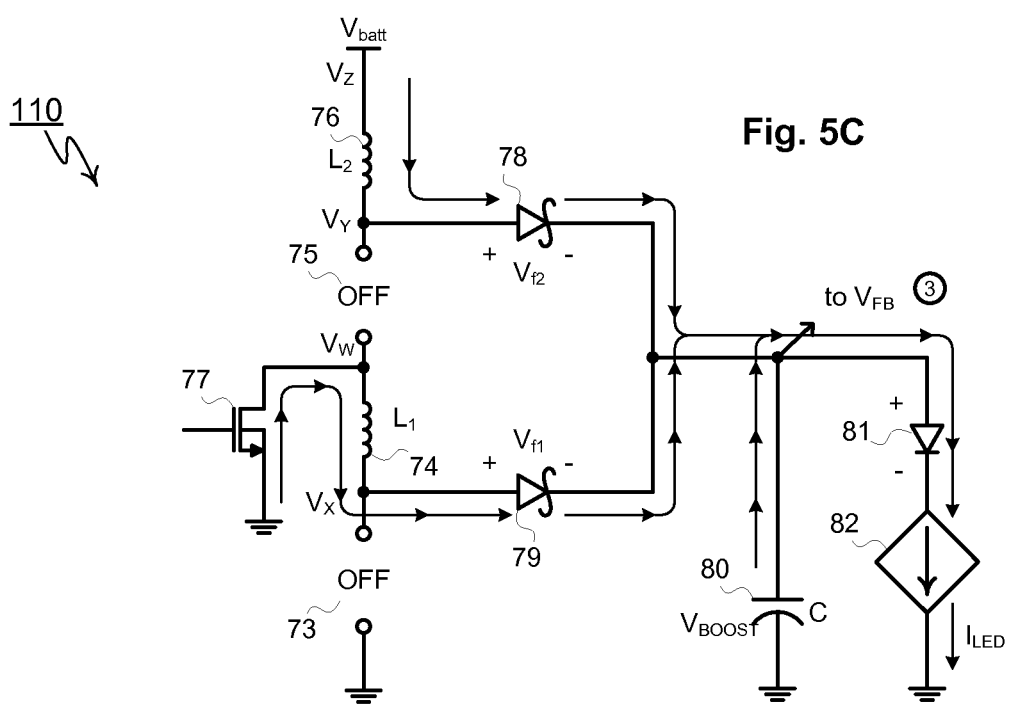
FIG. 5C is a schematic showing the dual series inductor boost converter of FIG. 4 during LED camera flash.

At time T2 flash LED 81 is enabled to conduct current $I_{LED}$ 132 as shown in graph 130. This condition is illustrated by equivalent-circuit 110 of FIG. 5C where conduction current (3) flows from inductors 76 and 74 directly into LED 81. During this interval some current may be supplied to capacitor 80 to prevent the output voltage $V_{boost}$ from sagging. Since inductors 74 and 76 and capacitor 80 do not contain adequate energy to maintain the flash for its full duration, the converter must repeatedly return to magnetizing state (1) as illustrated in graph 130 from time 2T to 4T. Because the converter is heavily loaded the inductor currents 133 and 134 exhibit a greater variation than shown by curve 131 before the flash was enabled, i.e. the ripple is increased. So long that the minimum current of downward slope 133 remains above load current 132, then current source 82 will maintain a constant current in the LED flash. In the camera flash application, the actual voltage regulation accuracy is not critical so long as the inductor currents remain above the maximum desired LED flash currents. To maintain energy balance, however, the duty factor and transfer pulse duration 124 must change compared to unloaded pulse width 123.

Figure 7:
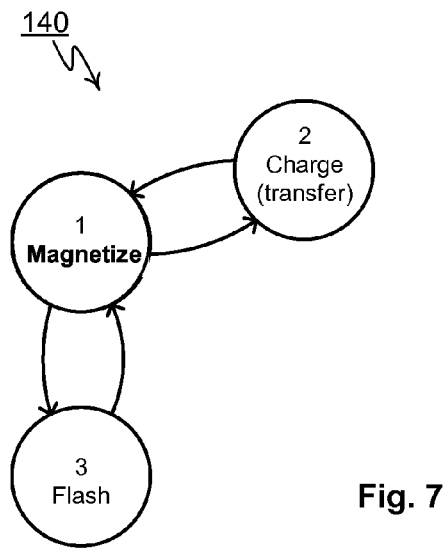
FIG. 7 is a state diagram describing operation of the dual series inductor boost converter of FIG. 4.

Returning to state diagram 140 of FIG. 7 during the flash interval the converter alternates between magnetize state (1) and flash transfer state (3). Specifically during magnetizing state (1) no energy is being transferred from the inductors to the load so that only capacitor 80 can maintain the LED conduction current. During this interval current supplied by capacitor 80 will cause the output voltage $V_{boost}$ to sag. This sag has to be replenished during interval (3). After the flash ends, the converter returns to the loop alternating between magnetizing state (1) and unloaded charge transfer state (2). These states can be correlated to the following table illustrating the operating conditions of disclosed converter 70.

| Phase | Function | M73/M75 | M77 | $V_x$ | $V_y$ | $V_w$ | LED |
|---|---|---|---|---|---|---|---|
| (1) | Magnetize | on | off | ~GND | $<V_{batt}$ | $<V_y$ | either |
| (2) | Transfer | off | on | $V_{boost}+V_f$ | $V_{boost}+V_f$ | ~GND | off |
| (3) | Flash | off | on | $V_{boost}+V_f$ | $V_{boost}+V_f$ | ~GND | On ($I_{LED}$) |

Synchronous High Current Boost

Figure 8:
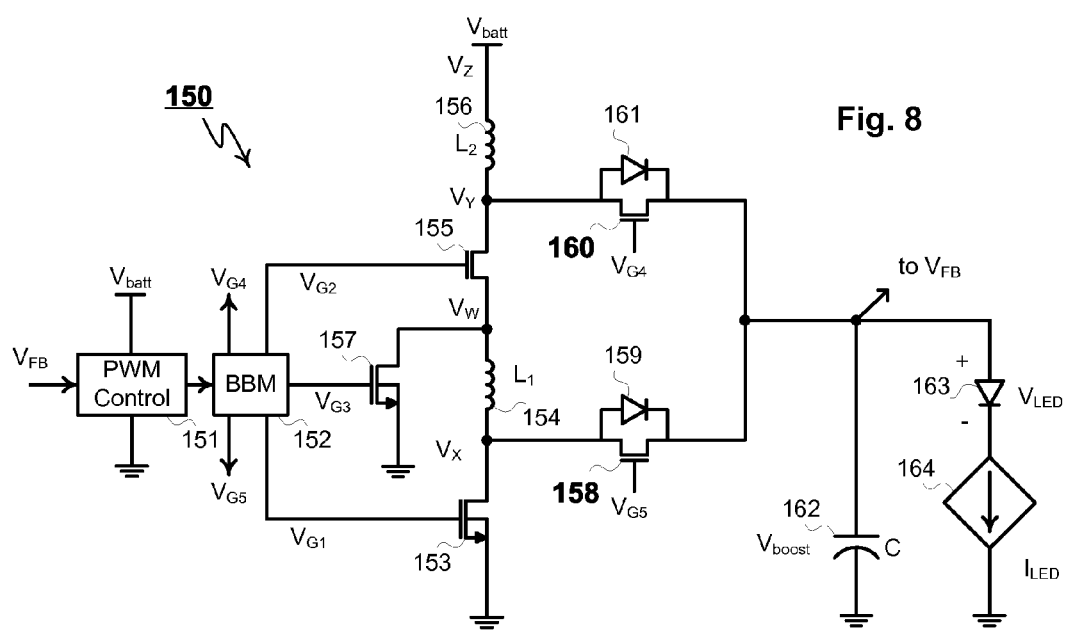
FIG. 8 is a schematic of a synchronous dual series inductor boost converter which corresponds to one possible embodiment of the present invention.

Another embodiment of the disclosed high current capable dual inductor boost converter is illustrated in FIG. 8. In synchronous converter 150 the rectifier diodes have been replaced with synchronous rectifier MOSFETs 158 and 160 enabling the converter to deliver higher currents with lower power losses.

The converter comprises similar components to converter 70 including PWM controller 151, BBM circuit 152, inductors 154 and 156, grounded N-channel MOSFETs 153 and 157, floating MOSFET 155, synchronous rectifier MOSFETs 158 and 160 with intrinsic P-N diodes 159 and 161 respectively, capacitor 162, LED 163 and controlled current source 164. During magnetizing MOSFETs 153 and 155 are both on and all the other power MOSFETs are all biased off. When MOSFETs 153 and 155 are biased off, the remaining MOSFETs 157 and synchronous rectifier MOSFETs 158 and 160 are turned on and conducting current.

Like floating MOSFET 155, synchronous rectifier MOSFETs 158 and 160 may comprise either N-channel or P-channel devices with appropriate changes in their gate drive circuitry. BBM circuitry 152 insures that MOSFETs 157, 158 and 160 remain off whenever MOSFETs 153 and 155 are on and vice versa, especially preventing simultaneous conduction during switching transitions. Specifically MOSFETs 158 and 160 are turned on for all or a portion of the time when diodes 159 and 161 are forward biased and carrying current. By shunting diode conduction with a conducting MOSFET channel the voltage drop is reduced from $V_f$ to the smaller voltage drop given by $I_L \cdot R_{DS}$ and efficiency is improved.

If the application for boost converter 150 is high current camera flash, the short flash duration means that synchronous rectification will not significantly improve average efficiency. The lower voltage drop across MOSFETs 158 and 160 does however divert inductor current from the rectifier diodes 159 and 161 and consequently ameliorates self heating in said diodes. It also improves the operating voltage range and the maximum load current since during charge transfer $V_x=V_y \approx V_{boost}$.

LED Flash Control

Figure 9A:
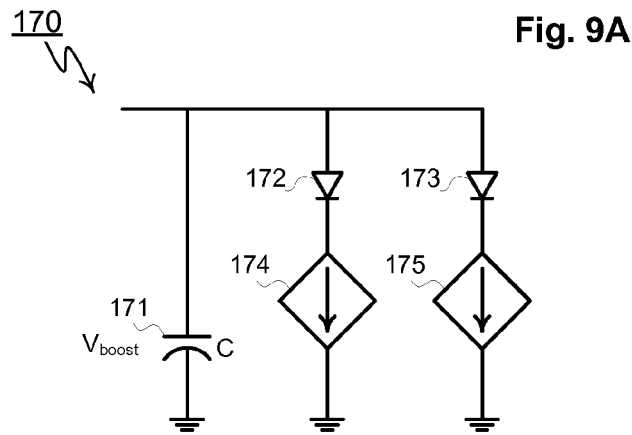
FIG. 9A is a schematic showing a flash driver utilizing a parallel series of controlled current sinks.

In example circuit 150 the LED flash current control is set by the current control device 164. In cases where the total LED current exceeds 1 A, it becomes advantageous to split the output into separate drives for two flash LEDs. This split output converter is illustrated in circuit 170 of FIG. 9A comprising output capacitor 171, high current diodes 172 and 173 driven by dual current sources 174 and 175 respectively. By splitting the currents among two LED arrays, current hogging can be avoided, heating is reduced, and quantum conversion efficiency is improved, resulting in greater LED brightness for the same total current. As shown the current control devices are "sink" type devices, i.e. they are grounded, but "source" type current sources may also be used.

Figure 9B:
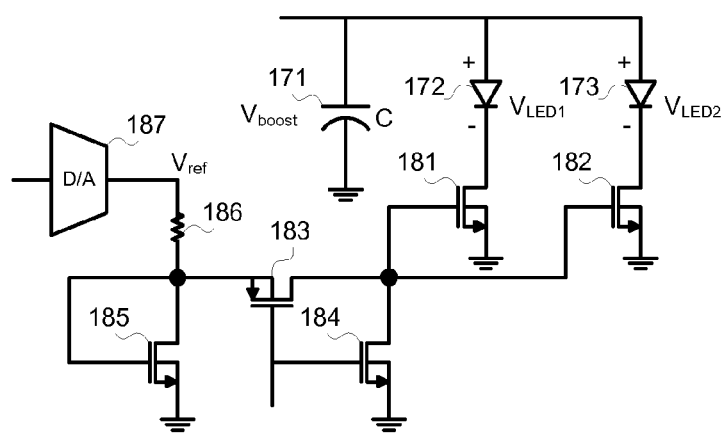
FIG. 9B is a schematic showing a flash driver utilizing a parallel series of controlled current sinks controlled by a Digital to Analog (D/A) converter.

One example implementation of the split current sink high current LED driver is illustrated in circuit 180 of FIG. 9B. As shown, current control devices 174 and 175 are physically realized by saturated N-channel MOSFETs biased at a defined gate bias $V_{GS(bias)}$ by the gate-to-source voltage of mirror MOSFET 184. The bias voltage is established by the output of digital-to analog converter 187 biasing the series combination of resistor 186 and threshold connected MOSFET 185. MOSFET 185 preferably has a layout that matches mirror devices 181 and 182. During a flash condition, this reference bias across MOSFET 185 is connected to gates of MOSFETs 181 and 182 by pass transistor 183. In the case of shutting off the current sinks, MOSFET 183 is turned off while grounded MOSFET 184 pulls down on the gates of mirror MOSFETs 181 and 182.

During a flash condition, this reference bias across MOSFET 185 is connected to gates of MOSFETs 181 and 182 by pass transistor 183. In the case of shutting off the current sinks, MOSFET 183 is turned off while grounded MOSFET 184 pulls down on the gates of mirror MOSFETs 181 and 182.

Triple Series Inductor High Current Boost Converter

Figure 10:
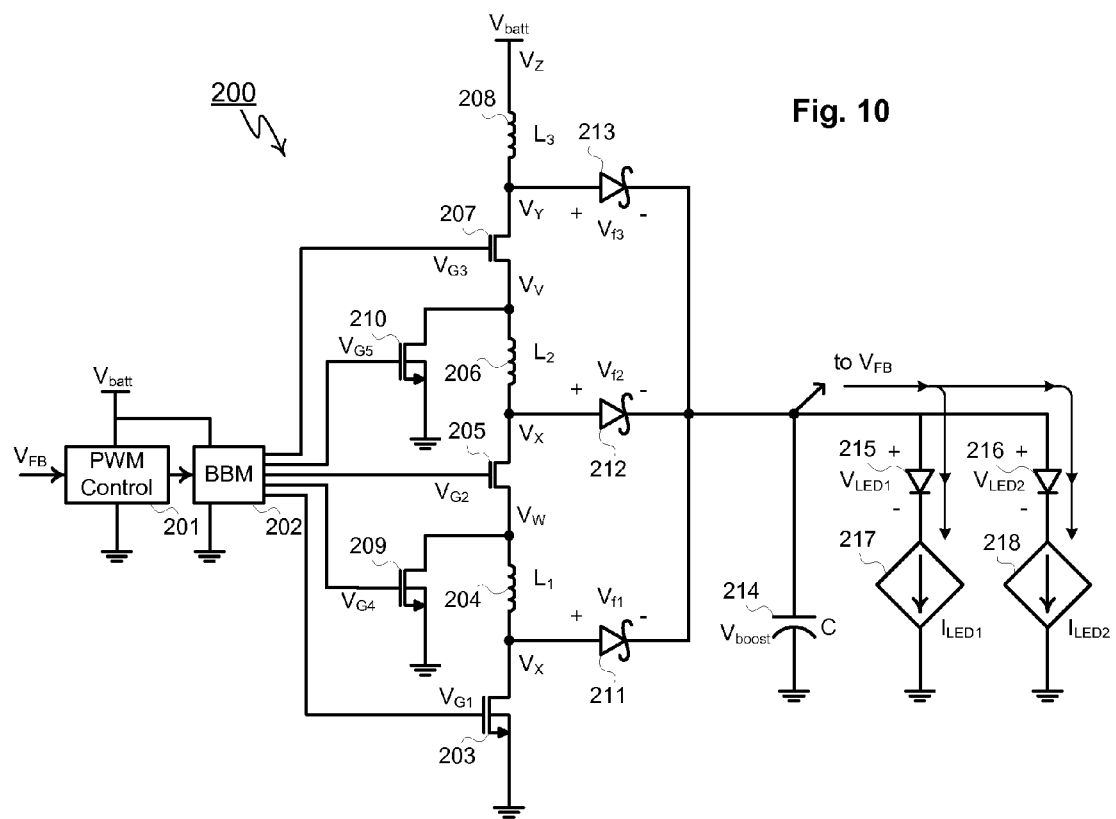
FIG. 10 is a schematic of a synchronous triple series inductor boost converter which corresponds to one possible embodiment of the present invention.

If even higher load currents are required, e.g. for very bright LED camera flash applications and xenon flash replacement, then a three-series-inductor version of the disclosed high current boost can be implemented as shown in FIG. 10. In circuit 200, the magnetizing current in inductors 204, 206 and 208 is controlled by MOSFETs 203, 205 and 207 in response to PWM circuit 201. MOSFETs 209 and 210 remain off during the magnetizing interval. In the transfer phase MOSFETs 203, 205 and 207 are shut off and the node voltage $V_x$, $V_u$ and $V_y$ fly above the converter's output $V_{boost}$ present across capacitor 214. BBM circuit 202 prevents any overlapping conduction of MOSFETs 203, 205 and 207 with any combination of MOSFETs 209 and 210. For any inductor terminal voltage greater than $(V_{boost}+V_f)$ the diodes conduct current, diodes 213, 212, and 211 become forward biased and transfer charge to capacitor 214. The diodes sum the inductor currents similar to that of wired OR logic whereby a load current triple that of the input is possible in converter 200.

To complete the current path MOSFETs 210 and 209 are turned on during the transfer phase grounding the potential at nodes $V_w$ and $V_v$. The $V_z$ potential on inductor 208 is as shown hardwired to $V_{batt}$. During charge transfer, only the current in inductor 208 flows through the battery $V_{batt}$. The other inductors complete their conduction patch through ground. The boost capacitor 214 then may be used to drive flash LEDs 215 and 216 under the control of current sinks 217 and 218.

Figure 11A:
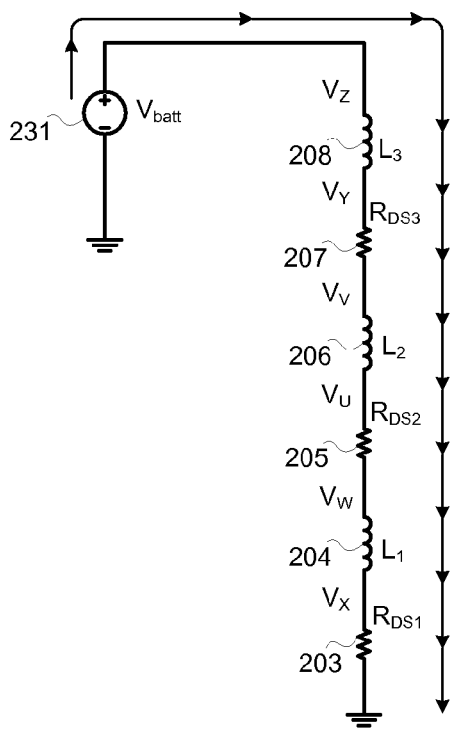
FIG. 11A shows a circuit that is an equivalent circuit to the synchronous triple series inductor boost converter of FIG. 10 during inductor magnetizing.

The condition of disclosed boost circuit 200 during magnetizing is illustrated in FIG. 11A where circuit 230 shows a series combination of a battery driving high-side inductor 208, MOSFET 207 represented as resistor $r_{DS3}$, floating inductor 206, MOSFET 205 represented as resistor $r_{DS2}$, near ground inductor 204, and low-side MOSFET 203 represented by resistance $r_{DS1}$. Circuit 230 can be considered a purely series connection.

Figure 11B:
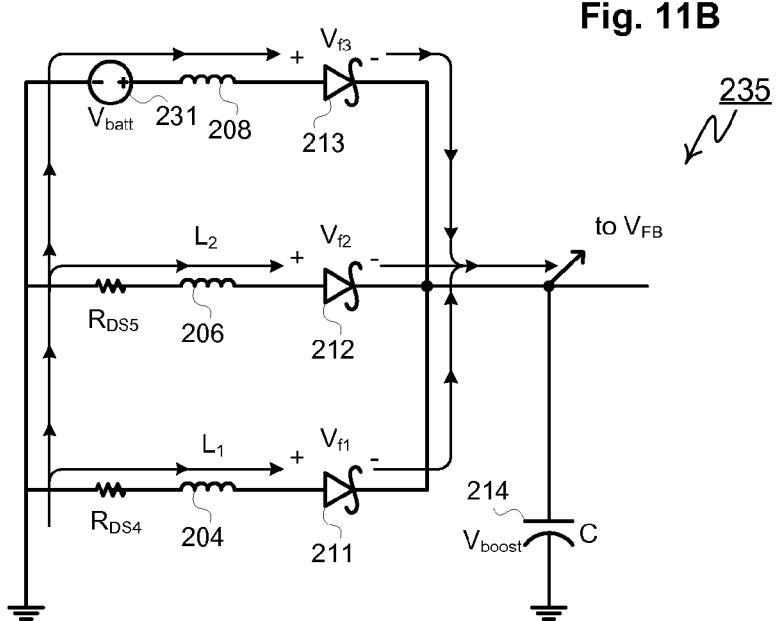
FIG. 11B shows a circuit that is an equivalent circuit to the synchronous triple series inductor boost converter of FIG. 10 during inductor magnetizing.

During charge transfer or flash operation, the equivalent circuit is a quasi parallel circuit like that shown in FIG. 11B, wherein in circuit 235 capacitor 214 is being charged to some fixed voltage by three parallel conducting legs, one comprising diode 211, inductor 204, and MOSFET 209 with a resistance $r_{DS4}$, another comprising diode 212, inductor 206 and MOSFET 210 with a resistance $r_{DS5}$, and a third leg comprising diode 213, inductor 208 and battery 231. The current in each leg is identical, so that the output current is the sum of all thee parallel legs. This current is triple the current flowing in magnetizing circuit 230.

High Current Boost with No Battery Current During Charge Transfer

Figure 12A:
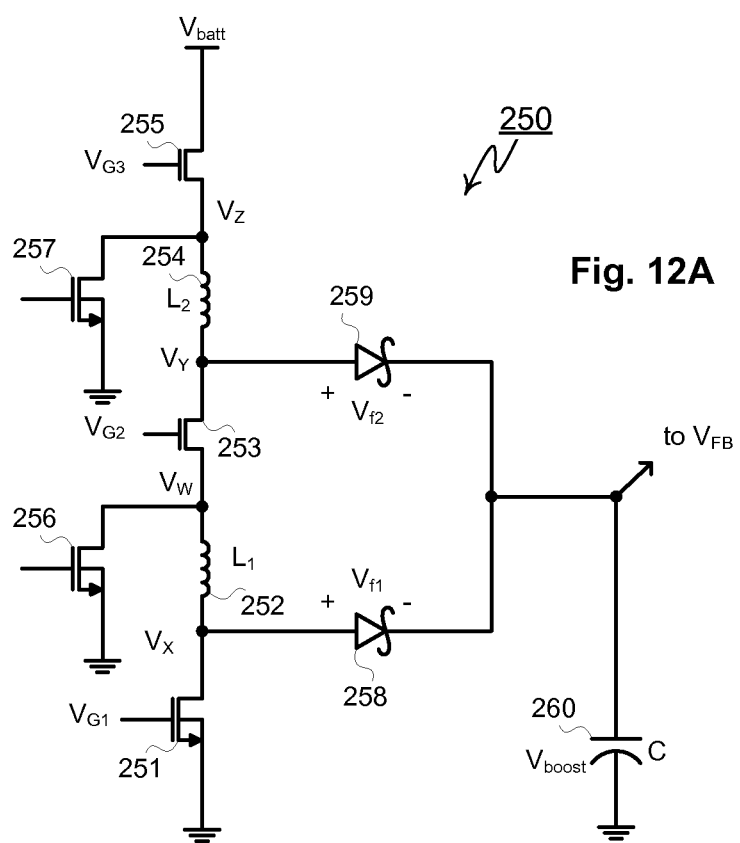
FIG. 12A is a schematic of a fully-bypassed synchronous dual series inductor boost converter which corresponds to one possible embodiment of the present invention.

In FIG. 12A another embodiment of a high current dual series inductor boost converter made in accordance with this invention comprises a means to completely eliminate battery current during the transfer or flash operating conditions. As shown, circuit 250 includes the added MOSFETs 255 and 257 controlling the potential at node $V_z$ in addition to aforementioned structure comprising inductors 254 and 252 and MOSFETs 253 and 251.

Figure 12B:
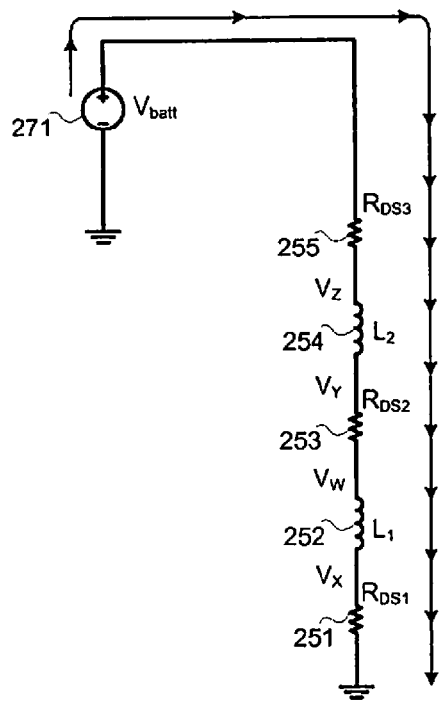
FIG. 12B shows a circuit that is an equivalent circuit to the fully-bypassed synchronous dual series inductor boost converter of FIG. 12A during inductor magnetizing.
Figure 12C:
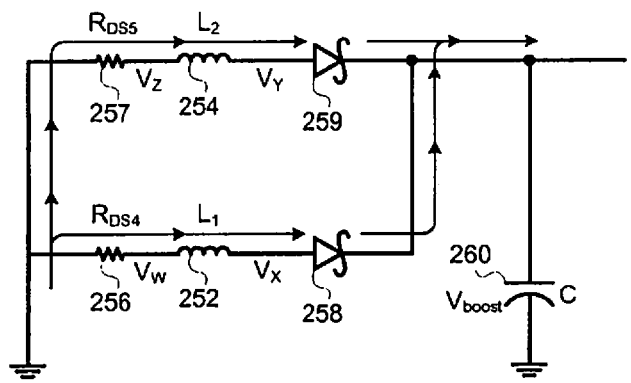
FIG. 12C shows a circuit that is an equivalent circuit to the fully-bypassed synchronous dual series inductor boost converter of FIG. 12A during charge transfer.

As illustrated in circuit 270 of FIG. 12B during magnetizing the battery 271 is connected in series with MOSFET resistances 255, 253 and 251 and with inductors 254 and 252. MOSFET resistance 255 is a new addition compared to previous embodiments of the invention. In the charge transfer mode shown in FIG. 12C, MOSFET 255 is turned off and MOSFET 257 grounds the $V_z$ node completely disconnecting it from the battery. The resulting network comprises two identical parallel legs comprising MOSFET resistance 257, inductor 254 and diode 259 in parallel with MOSFET resistance 256, inductor 252 and diode 258. Both paths charge capacitor 260 through a circuit connected to ground with no battery connection. The current spike in the battery during camera flash is thereby completely eliminated.

Throughout this document the term "ground" should be given the broadest possible interpretation. Thus, ground can refer to the specific case of zero volts but, where appropriate could also refer to a non-zero potential. This is specifically the case where an input supply has a positive and a negative pole. In such cases, the negative pole is electrically equivalent to ground.

What is claimed is:

1. A step-up switching voltage regulator comprising:
    a first inductor coupled between an input voltage and a first node;
    a first switch connected between the first node and a second node;
    a second inductor connected between the second node and a third node;
    a second switch connected between the third node and ground;
    a third switch connected between the second node and ground; and
    a control circuit connected to drive the first, second, and third switches in a repeating sequence that includes a magnetizing phase in which the first and second inductors are connected in series between the input voltage and ground, and a charge transfer phase in which the first and second inductors are connected in parallel to provide current to an output node with each of the first inductor and the second inductor being connected between ground and the output node.

2. The step-up switching voltage regulator of claim 1 further comprising a first diode connected between the first node and the output node and a second diode connected between third node and the output node.

3. The step-up switching voltage regulator of claim 1 further comprising a fourth switch connected between the first node and the output node and a fifth switch connected between the third node and the output node, the control circuit being configured to cause the fourth and fifth switches to be on during at least part of the charge transfer phase and off during the magnetizing phase.

4. The step-up switching voltage regulator of claim 1 further comprising an output capacitor connected between the output node and ground.

5. The step-up switching voltage regulator of claim 1 further comprising at least one series combination of a light emitting diode (LED) and a current source connected between the output node and ground.

6. A step-up switching voltage regulator comprising:
a plurality of inductors;
a switching network, the switching network including a plurality of first switches and at least one second switch, each first switch of the plurality of first switches connecting each inductor of the plurality of inductors in a series between the input voltage and ground, each second switch of the at least one second switch coupling each inductor other than a first inductor in the series between an output node and ground; and
a control circuit connected to each first switch of the plurality of first switches and to each second switch of the at least one second switch and configured to drive the switching network in a repeating sequence that includes a magnetizing phase in which each inductor of the plurality of inductors is connected in series between the input voltage and ground, and a charge transfer phase in which each inductor of the plurality of inductors is connected in parallel to provide current to the output node with at least two inductors of the plurality of inductors being connected between ground and the output node through a respective second switch of the at least one second switch.

7. The step-up switching voltage regulator of claim 6 wherein each inductor of the plurality of inductors is connected between ground and the output node during the charge transfer phase.

8. The step-up switching voltage regulator of claim 6 wherein at least one of the plurality of inductors is connected between the input voltage and the output node during the charge transfer phase.

9. The step-up switching voltage regulator of claim 6 further comprising respective diodes connected between each inductor of the plurality of inductors and the output node.

10. The step-up switching voltage regulator of claim 6 further comprising respective third switches connected between each inductor of the plurality of inductors and the output node, the control circuit being configured to cause the respective third switches to be on during at least part of the charge transfer phase and off during the magnetizing phase.

11. The step-up switching voltage regulator of claim 6 further comprising an output capacitor connected between the output node and ground.

12. The step-up switching voltage regulator of claim 6 further comprising at least one series combination of a light emitting diode (LED) and a current source connected between the output node and ground.

13. A method for controlling a step-up switching voltage regulator that includes two or more inductors and a switching network, the switching network including a plurality of first switches and at least one second switch, the method comprising:

configuring the two or more inductors into a magnetizing phase in which each first switch of the plurality of first switches is on and conducting, each second switch of the at least one second switch is off and not conducting, and each inductor of the two or more inductors is connected in series between an input voltage and ground; and configuring the two or more inductors into a charge transfer phase in which each first switch of the plurality of first switches is off and not conducting, each second switch of the at least one second switch is on and conducting, and each inductor of the two or more inductors is connected in parallel to provide current to an output node with at least two inductors of the two or more inductors being connected between ground and the output node through a respective second switch of the at least one second switch.

14. The method of claim 13 wherein the switching network further includes respective third switches connected between each inductor of the two or more inductors and the output node, the method further comprising:
causing the respective third switches to be on during at least part the charge transfer phase; and
causing the respective third switches to be off during the magnetizing phase.

15. The step-up switching voltage regulator of claim 1 wherein the control circuit includes a break-before-make buffer connected to the first, second, and third switches, the make-before-break buffer being configured to ensure that the first, second, and third switches are not simultaneously on and conducting.

16. The step-up switching voltage regulator of claim 6 wherein the plurality of inductors includes at least three inductors.

17. The step-up switching voltage regulator of claim 6 wherein the first inductor in the series is connected to the input voltage by one of the plurality of first switches.

18. The step-up switching voltage regulator of claim 17 wherein the at least one second switch includes a plurality of second switches, each respective second switch of the plurality of second switches coupling a respective inductor of the plurality of inductors to ground.

19. The method of claim 13 wherein configuring the two or more conductors into the charge transfer phase includes ensuring that no more than one inductor of the two or more inductors is connected between the input voltage and the output node.

20. The method of claim 13 wherein configuring the two or re conductors into the charge transfer phase includes configuring each inductor of the two or more inductors to be connected in parallel to provide current to the output node with each inductor of the two or more inductors being connected between ground and the output node.

* * * * *

UNITED STATES PATENT AND TRADEMARK OFFICE
CERTIFICATE OF CORRECTION

PATENT NO. : 9,071,139 B2  Page 1 of 1
APPLICATION NO. : 12/194411
DATED : June 30, 2015
INVENTOR(S) : Richard K. Williams It is certified that error appears in the above-identified patent and that said Letters Patent is hereby corrected as shown below:

In the Claims:

Column 14, Line 47, Claim 20, delete "re conductors" and insert -- more conductors --.

Signed and Sealed this
Twenty-fourth Day of November, 2015

Michelle K. Lee
*Director of the United States Patent and Trademark Office*